United States Patent
Martin

(10) Patent No.: US 9,259,122 B2
(45) Date of Patent: Feb. 16, 2016

(54) METHODS, SYSTEMS AND APPARATUS FOR PROMOTING THE POURABILITY OF SEMI-FROZEN AND SEMI-FLUIDIC BEVERAGES FROM BEVERAGE CONTAINERS

(76) Inventor: Peter Martin, San Jose, CA (US)

(*) Notice: Subject to any disclaimer, the term of this patent is extended or adjusted under 35 U.S.C. 154(b) by 964 days.

(21) Appl. No.: 12/705,698

(22) Filed: Feb. 15, 2010

(65) Prior Publication Data
US 2011/0199852 A1   Aug. 18, 2011

(51) Int. Cl.
  *A47J 43/07*   (2006.01)
  *A47J 43/046*  (2006.01)

(52) U.S. Cl.
  CPC ............ *A47J 43/0727* (2013.01); *A47J 43/046* (2013.01)

(58) Field of Classification Search
  CPC .................................................. A47J 43/0727
  USPC ................. 366/110–115, 205, 314, 123, 128; 241/98, 199.12, 282.1; 601/71, 74
  See application file for complete search history.

(56) References Cited

U.S. PATENT DOCUMENTS

| | | | | |
|---|---|---|---|---|
| 1,607,811 A * | 11/1926 | Blum | ............................ | 366/110 |
| 2,829,529 A * | 4/1958 | Fleming | ............................ | 74/87 |
| 2,970,235 A * | 1/1961 | Pike | ................................ | 310/83 |
| 3,465,974 A * | 9/1969 | Eckert | ........................... | 241/153 |
| 3,550,657 A * | 12/1970 | Swanke | ...................... | 241/199.1 |
| 3,581,125 A * | 5/1971 | Arndt et al. | .............. | 310/316.01 |
| 3,881,705 A * | 5/1975 | Greenspan | ................. | 241/282.2 |
| 4,448,360 A * | 5/1984 | Williams | ......................... | 241/92 |
| 4,549,535 A | 10/1985 | Wing | | |
| 5,425,579 A * | 6/1995 | Sampson | ...................... | 366/130 |
| 5,797,313 A * | 8/1998 | Rothley | ........................... | 99/483 |
| 5,833,362 A | 11/1998 | Shepard | | |
| 5,842,901 A * | 12/1998 | Montgomery | .................. | 446/77 |
| 5,902,256 A * | 5/1999 | Benaron | ......................... | 601/15 |
| 5,921,676 A * | 7/1999 | Reynolds et al. | ............. | 366/208 |
| 6,609,821 B2 * | 8/2003 | Wulf et al. | ..................... | 366/206 |
| 6,832,543 B2 * | 12/2004 | Siano et al. | ...................... | 99/340 |
| 6,962,432 B2 * | 11/2005 | Hofeldt | ......................... | 366/118 |
| 7,439,859 B2 * | 10/2008 | Humphrey | ................. | 340/572.1 |
| 2007/0145067 A1 | 6/2007 | Headlee | | |
| 2007/0201301 A1 * | 8/2007 | Klepinger | ...................... | 366/110 |
| 2008/0298172 A1 * | 12/2008 | Krasznai | ....................... | 366/314 |
| 2010/0008178 A1 | 1/2010 | Fahrion | | |
| 2011/0024537 A1 * | 2/2011 | Gonzalez | ................... | 241/101.2 |

OTHER PUBLICATIONS

National Presto Industries, Inc., Blender Questionnaire, Sep. 3, 1991.
National Presto Industries, Inc., Presto Gourmet Blender, Instruction and Recipe Book, 1968.

* cited by examiner

*Primary Examiner* — David Sorkin
*Assistant Examiner* — Abbas Rashid

(57) ABSTRACT

A beverage container for a blender includes one or more vibrating mechanisms coupled to a bottom portion of the beverage container or integrated within one or more walls of the beverage container. After a beverage has been blended, the one or more vibrating mechanisms are activated as the beverage is being poured. Vibrations from the one or more vibrating mechanisms are mechanically transmitted to the beverage container, thereby promoting the pourability of the beverage from the beverage container, including dislodging ingredients in the beverage that became lodged or trapped in crevices of the beverage container during the prior blending process, and freeing up beverage ingredients that accumulated at the bottom of the beverage container during the prior blending process.

8 Claims, 11 Drawing Sheets

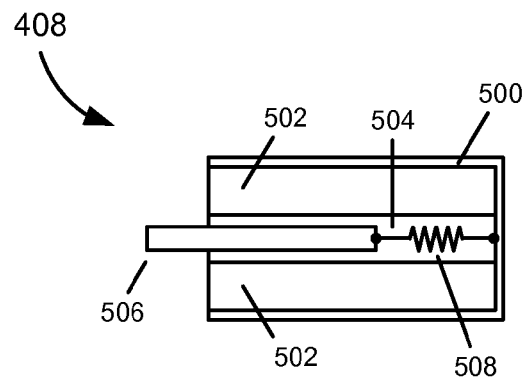 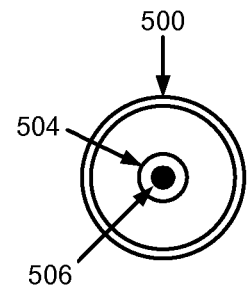
FIGURE 5A  FIGURE 5B
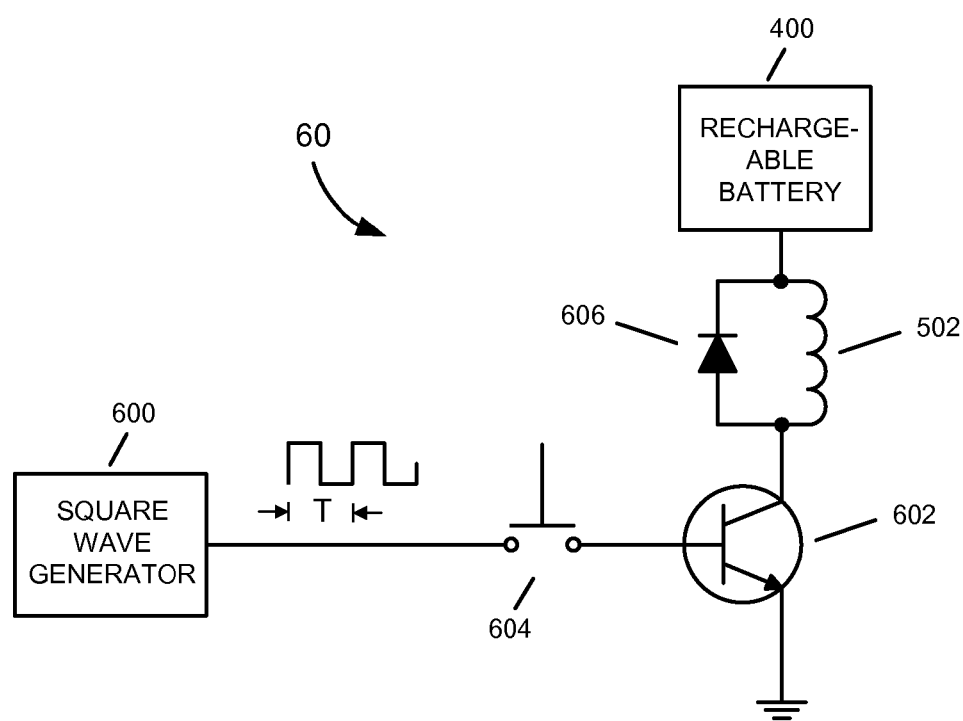
FIGURE 6

METHODS, SYSTEMS AND APPARATUS FOR PROMOTING THE POURABILITY OF SEMI-FROZEN AND SEMI-FLUIDIC BEVERAGES FROM BEVERAGE CONTAINERS

FIELD OF THE INVENTION

The present invention is directed at methods, systems and apparatus for promoting the pourability of beverages from beverage containers, particularly, but not limited to, from beverage containers used in the preparation and blending of semi-frozen and semi-fluidic beverages.

BACKGROUND OF THE INVENTION

Slushies, smoothies, milkshakes and other semi-frozen and semi-fluidic beverages are typically prepared using a blender, which is a well-known appliance comprising a container with a removable lid and a motor-driven blade at the container bottom for blending and preparing beverages. Blenders are useful since they simplify and hasten the process of preparing these types of beverages. However, one frustrating side-effect of their use is that during blending some of the beverage ingredients tend to become lodged in crevices of the blender container and/or accumulate at the bottom of the container. The viscosities of these types of beverages are also usually high, and often remain high even after blending. The high viscosities also makes it difficult to pour these types of beverage from blender containers.

After a beverage has been blended, the person operating the blender will typically attempt to use a spatula, spoon, or other utensil to promote pourability of the beverage. However, not only is this technique cumbersome it is also only moderately effective. Indeed, a significant amount of the beverage usually ends up being discarded as waste when the blender is cleaned after use.

Another approach used by blender operators in an attempt to promote pourability is to hit (i.e., bang on) the side of the blender container as the beverage is being poured. This approach is also not entirely effective. It can also cause discomfort, particularly to those blender operators that must use the blender frequently throughout the day, such as employees of beverage companies. Repeated banging on the sides of blender containers not only cause soreness to the operators' palms, in some cases it can even result in wrist and hand injuries.

SUMMARY OF THE INVENTION

Methods, systems and apparatus for promoting the pourability of semi-frozen and semi-fluidic beverages from beverage containers (e.g., beverage containers of blenders) are disclosed. An exemplary beverage container for a blender includes one or more vibrating mechanisms coupled to a bottom portion of the beverage container or integrated within one or more walls of the beverage container. The beverage container is adapted to dock to a blender base, which includes a motor for turning a blade in the beverage container when the beverage container is docked on the blender base. After blending and after the beverage container is undocked from the blender base, the one or more vibrating mechanisms are activated as the beverage is being poured. Vibrations from the one or more vibrating mechanisms are mechanically transmitted to the beverage container, thereby promoting the pourability of the beverage from the beverage container, including dislodging ingredients in the beverage that became lodged or trapped in crevices of the beverage container during the prior blending process, and freeing up beverage ingredients that accumulated at the bottom of the beverage container during the prior blending process.

Further features and advantages of the present invention, including descriptions of the structure and operation of the above-summarized and other exemplary embodiments of the invention, will now be described in detail with respect to accompanying drawings, in which like reference numbers are used to indicate identical or functionally similar elements.

BRIEF DESCRIPTION OF THE DRAWINGS

FIGS. 5A and 5B are simplified drawings of the plunger-type solenoid used in the one or more vibrating mechanisms of the collar in FIG. 4;

FIG. 6 is an electrical schematic of a vibration control circuit that may be used to activate and deactivate the coils of the plunger-type solenoids used in the one or more vibrating mechanisms of the collar in FIG. 4;

DETAILED DESCRIPTION

Figure 1:
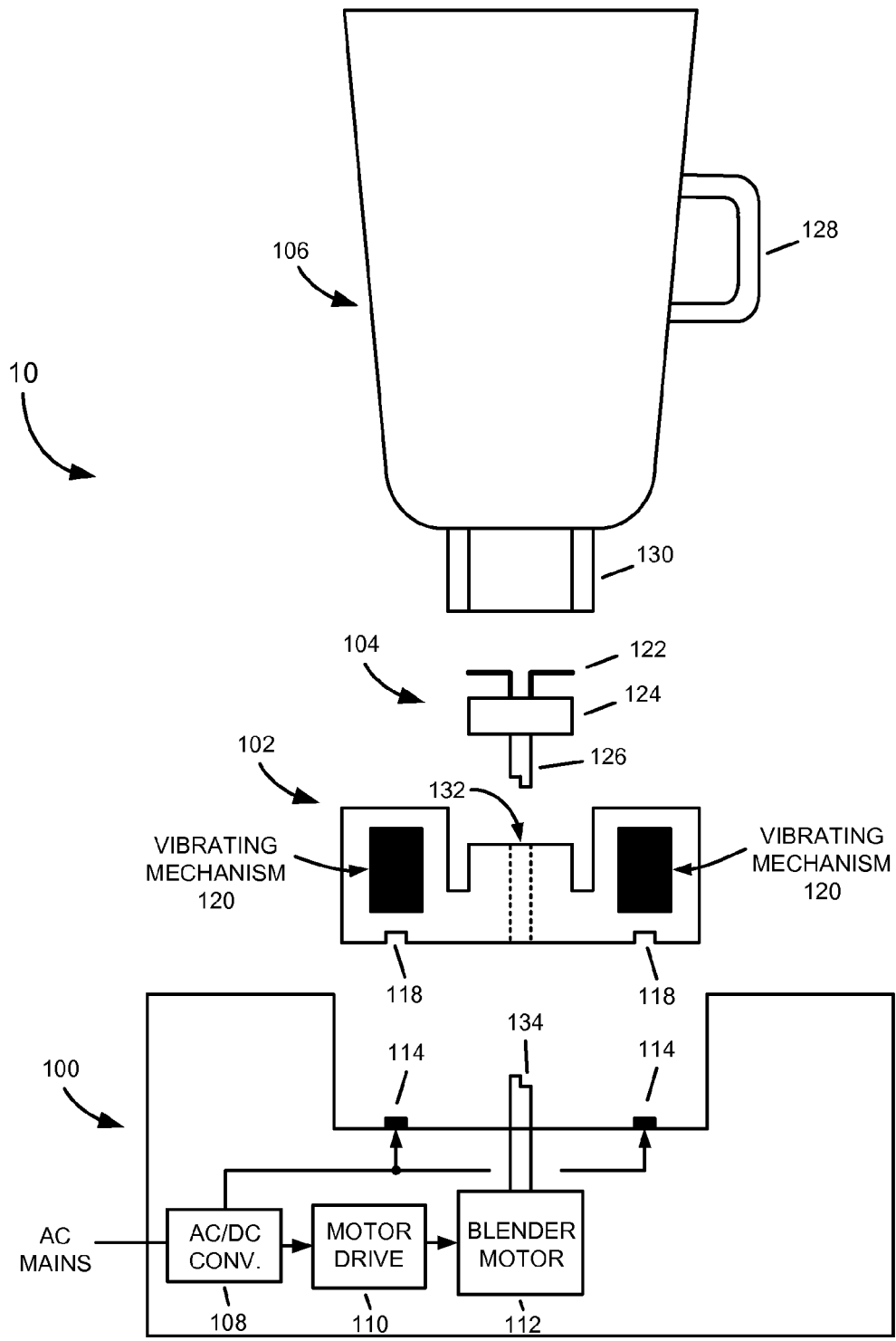
FIG. 1 is a side sectional drawing of a beverage blender, according to an embodiment of the present invention, in unassembled form.

Referring to FIG. 1, there is shown a side sectional drawing of a beverage blender 10 in unassembled form, according to an embodiment of the present invention. The beverage blender 10 comprises a blender base 100, a collar 102, a blade unit 104, and a beverage container 106. The blender base 100 includes an alternating current to direct current (AC/DC) converter 108, a motor drive circuit 110, and a blender motor 112. The AC/DC converter 108 is configured to convert AC power from the AC mains to DC power. The DC power is supplied to the motor drive circuit 110, which operates to control the activation and speed of the blender motor 112. DC power is also generated and supplied to electrical contacts 114, which as explained below are used to connect to electrical contacts 118 on the collar 102.

In one embodiment of the invention, the collar 102 is a cylindrically-shaped body, as is more readily apparent in later drawings (see, for example, FIG. 4), and includes within its interior (or alternatively on its outer surface) one or more vibrating mechanisms 120. Accordingly, collectively, the collar 102 and vibrating mechanisms 120 comprise a vibrator. When the collar 102 is secured in the blender base 100 its electrical contacts 118 are electrically connected to the electrical contacts 114 on the blender base 104. This allows DC power from the AC/DC converter 108 to be used to charge a rechargeable power source (not shown) such as a rechargeable battery contained within or on the collar 102. (In an alternative embodiment, the kinetic energy of the blender motor may be used as the energy source for recharging the rechargeable power source.) The rechargeable power source is the source of power for the one or more vibrating mechanisms 120, and as discussed in more detail below, the one or more vibrating mechanisms 120 generate vibrations in the collar 102 and beverage container 106 during pouring to promote the pourability of the beverage from the beverage container 106, including extracting lodged and trapped beverage ingredients from crevices and recesses in the beverage container 106 and ingredients accumulated at the bottom of the beverage container 106 due to a previously applied blending process. To reduce the effect of the vibrations on the person pouring the beverage, the handle 128 may be designed to be an anti-vibration handle using, for example, shock absorbing materials such as elastomers, gels, or the like.

It should be emphasized here that whereas a collar 102 is used in this exemplary embodiment, to both house the vibrating mechanisms 120 and to transfer vibrations from the one or more vibrating mechanisms 120 to the beverage container 106, other types of vibrators not requiring the use of a collar may be employed. Indeed, any vibrator or vibrating mechanism that can be permanently or releasably attached to the base portion 130 of the beverage container 106 or integrated within one or more walls of the beverage container 106 or base portion 130, whether by use of a collar or not, may be used.

The blade unit 104 comprises a blade 122 or other type of stirrer, a blade base 124, and a blade shaft 126. The beverage container 106 has a handle 128 and includes a bottom portion 130 for receiving the collar 102 and blade unit 104. The collar 102 and blade unit 104 may be designed as either a single integrated unit or as separate assemblies. According to one embodiment of the invention, the collar 102 and bottom portion 130 have complementary screw threads that allow the collar 102 to be releasably attached to (i.e., screwed on and off of) the bottom portion 130 of the beverage container 106. The ability to detach the collar 102 from the beverage container 106 allows the various blender components to be separated for easier cleaning In alternative embodiments, the collar 102 is either permanently attached to the bottom portion 130 of the beverage container 106 or is not a separate component of the blender assembly but an integral part of the beverage container 106 itself.

Figure 2:
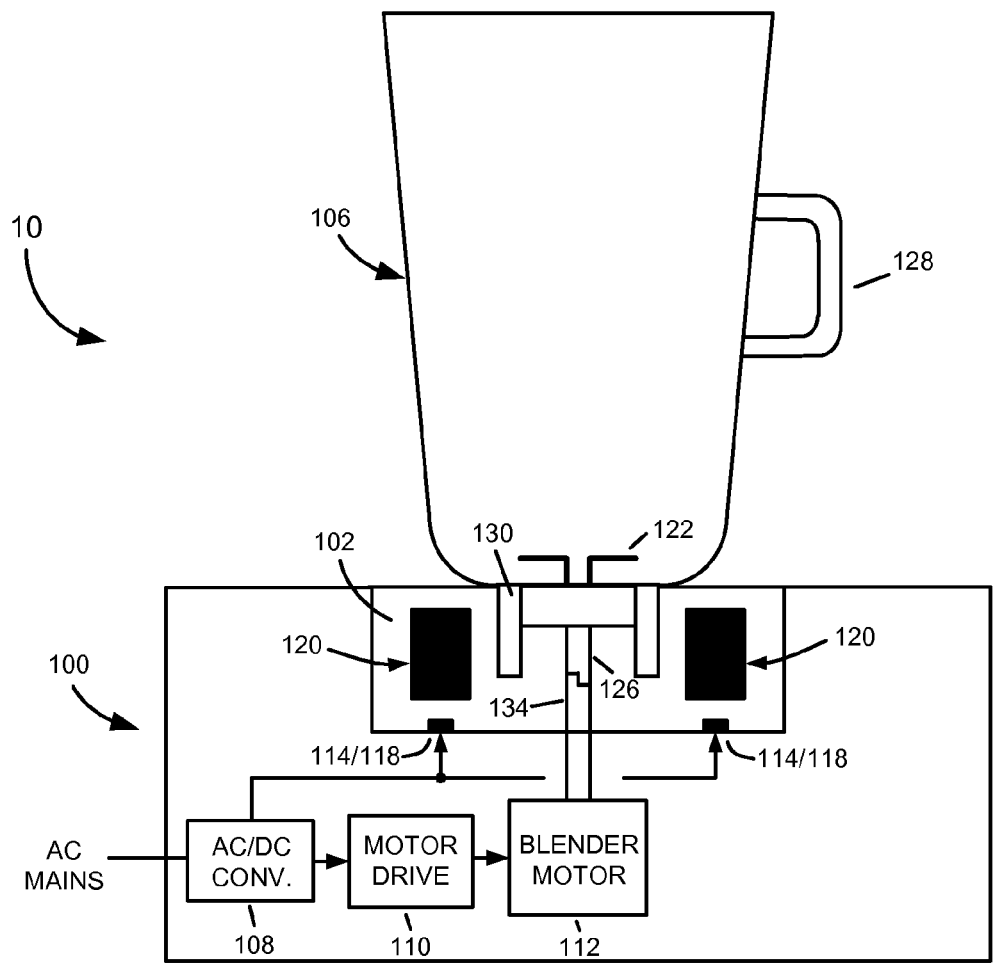
FIG. 2 is a side sectional drawing of the beverage blender in FIG. 1 in assembled form.

For the exemplary embodiment shown in FIG. 1, the collar 102 further includes a shaft aperture 132 for receiving both the blade shaft 126 and a drive shaft 134 of the blender motor 112. As illustrated in FIG. 2, when the collar 102 is attached to the bottom portion 130 of the beverage container 106 and the beverage container 106 and collar 102 are secured (i.e., docked) on the blender base 100, the drive shaft 134 of the blender motor 112 extends through the shaft aperture 132 and engages the blade shaft 126. In this configuration, the electrical contacts 118 on the collar 102 are also electrically connected to the electrical contacts 114 on the blender base 100.

Figure 3:
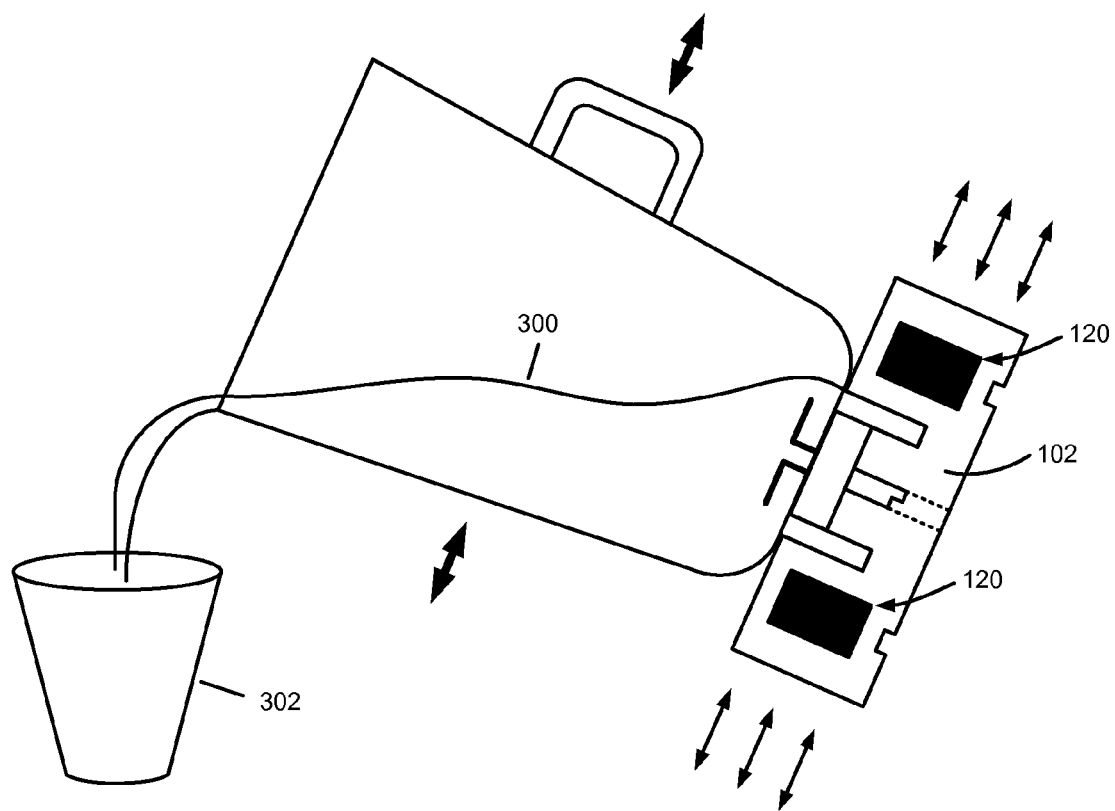
FIG. 3 is a drawing illustrating a process of pouring a semi-frozen or semi-fluidic beverage from the beverage container of the beverage blender in FIGS. 1 and 2 into a receiving cup, highlighting the vibration forces that are transferred to the beverage container from one or more vibrating mechanisms configured within a collar of the blender.

FIG. 3 is a drawing illustrating a method of pouring a semi-frozen or semi-fluidic beverage 300 (e.g., milkshake, smoothie, slushy, fruit drink, etc.) from the beverage container 106 of the beverage blender 10 in FIGS. 1 and 2 into a receiving cup 302. As the beverage 300 is being poured, or upon activation of a control circuit (examples provided later), the one or more vibrating mechanisms 120 begin vibrating. The vibrations, which are symbolized by the opposing arrows in the drawing, are transferred (i.e., mechanically transmitted) to the collar 102 and then to the bottom portion 130 of the beverage container 106. The vibrations promote pourability of the semi-frozen or semi-fluidic beverage 300 from the beverage container 106, including dislodging beverage ingredients that became lodged or trapped in crevices of the beverage container 106 during a prior blending process, and freeing up ingredients that accumulated at the bottom of the beverage container 106 during the prior blending process.

Figure 4:
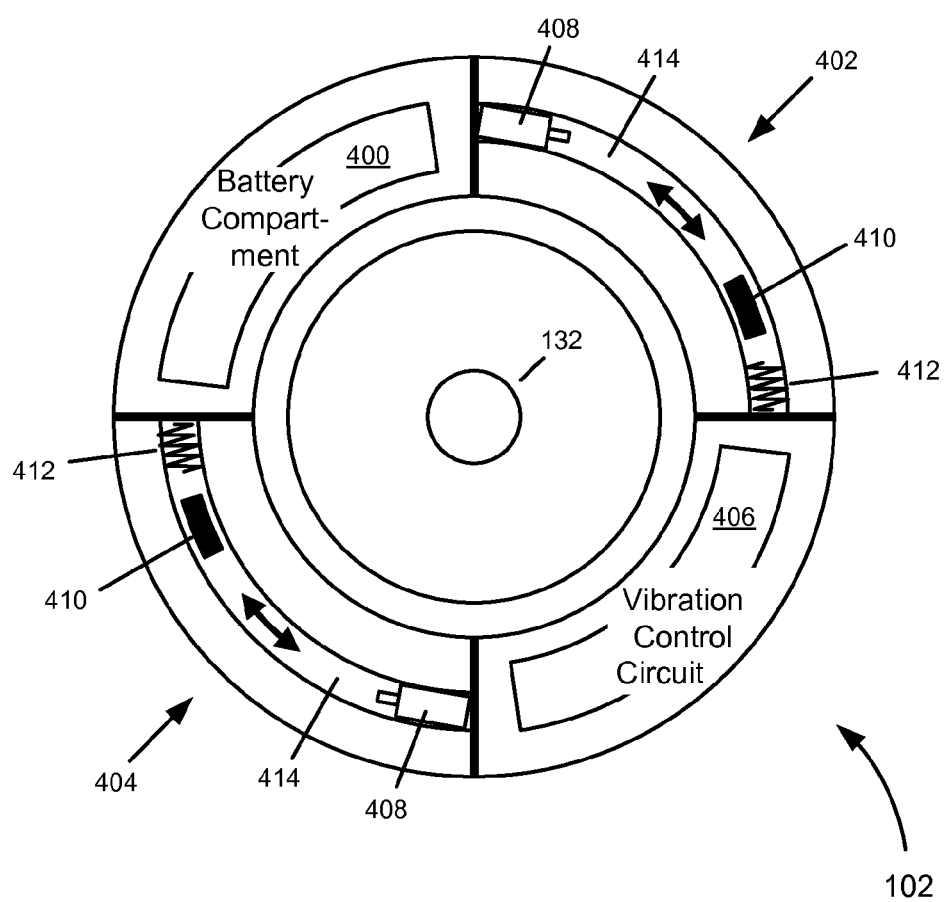
FIG. 4 is a top view of a collar that may be used in the beverage blender in FIG. 1, highlighting one way of implementing the one or more vibrating mechanisms in the collar, in accordance with an embodiment of the present invention.

The one or more vibrating mechanisms 120 and their configuration within the collar 102 can be implemented in various ways. FIG. 4, which is a top view of a collar 102 that may be used in the beverage blender 10 in FIG. 1, illustrates one approach, according to an embodiment of the present invention. As shown in FIG. 4, the collar 102 is partitioned into several compartments (in this example, four). A first compartment is configured to house a DC power source, such as a rechargeable battery 400; second and third compartments are configured to house first and second vibrating mechanisms 402 and 404; and a fourth compartment is configured to house a vibration control circuit 406. (For ease in illustration, the electrical connections among the rechargeable battery 400, vibrating mechanisms 402 and 404, and vibration control circuit 406 have been omitted from this drawing. However, they are shown and described later in reference to subsequent drawings.)

Each of the first and second vibrating mechanisms 402 and 404 in the collar 102 in FIG. 4 are implemented using a plunger-type solenoid 408, a movable mass 410 (e.g., heavy metallic object), and a spring 412. The movable mass 410 of each vibrating mechanism 402 and 404 is configured to move along an associated arcuate track 414 disposed between the plunger-type solenoid 408 at one end of the track 414 and the spring 412 at the opposing end of the track 414. When activated, the plunger-type solenoid 408 of each vibrating mechanism 402 and 404 forces its movable mass 410 along the track 414 toward the spring 412. Upon arriving at the spring 412, the movable mass 410 causes the spring 412 to compress and then decompress, thereby forcing the movable mass 410 to travel back toward the plunger-type solenoid 408. Once the movable mass 410 arrives back at the plunger-type solenoid 408, the plunger-type solenoid 408 is activated once again to force the movable mass 410 back toward the spring 412. This process is repeated, resulting in the movable mass 410 of each vibrating mechanism 402 and 404 oscillating between the plunger-type solenoid 408 and the spring 412. The oscillating movable masses 410 generate the desired vibration forces in the collar 102 and in the beverage container 106 when the collar 102 is attached to the beverage container 106.

FIGS. 5A and 5B are simplified drawings of the plunger-type solenoid 408 used to form the one or more vibrating mechanisms 402 and 404 of the collar 102 in FIG. 4. Each plunger-type solenoid 408 is housed in a housing 500 and includes a coil 502 wound around a cylinder 504, within which a plunger (i.e., piston) 506 moves longitudinally. A first end of the plunger 506 is attached to a first end of a return spring 508. The second, opposing end of the return spring 508 is attached to a wall of the housing 500. When the coil 502 is activated by an electrical current an electromotive force is generated by the coil 502, causing the plunger 506 to accelerate along the length of the cylinder 504 in a direction away from the return spring 508. This causes the second end of the plunger 506 to momentarily eject from the housing 500. Ejection of the second end of the plunger 506 is the mechanism used to push the movable mass 410 along the arcuate track 414 in the vibrating mechanisms 402 and 404 in FIG. 4. When the coil 502 is deactivated, the return spring 508 pulls the plunger 506 back into the housing 500.

FIG. 6 is an electrical schematic of a vibration control circuit 60 that may be used to activate and deactivate the coil 502 of the plunger-type solenoid 408 used in the vibrating mechanisms 402 and 404 of the collar 102 in FIG. 4. The vibration control circuit 60 comprises a square wave generator 600 (e.g., formed using a 555 timer chip) configured to drive a transistor 602 and a switch 604 for activating/deactivating the vibrating mechanisms 402 and 404. The coil 502 of the plunger-type solenoid 408 is coupled between the rechargeable battery 400 and the collector of the transistor 602. A protection diode 606 is connected across the coil 502 to protect the transistor 602 from large reverse voltages (i.e., known as back EMF) generated by the coil 502 as it is repeatedly energized (i.e., activated) and de-energized (i.e., deactivated). The square wave generator 600 is tuned so that the frequency (f=1/T, where T is the wave period) of the square wave reinforces the natural resonance frequency of oscillation of the movable mass 410 along the track 414.

Figure 7:
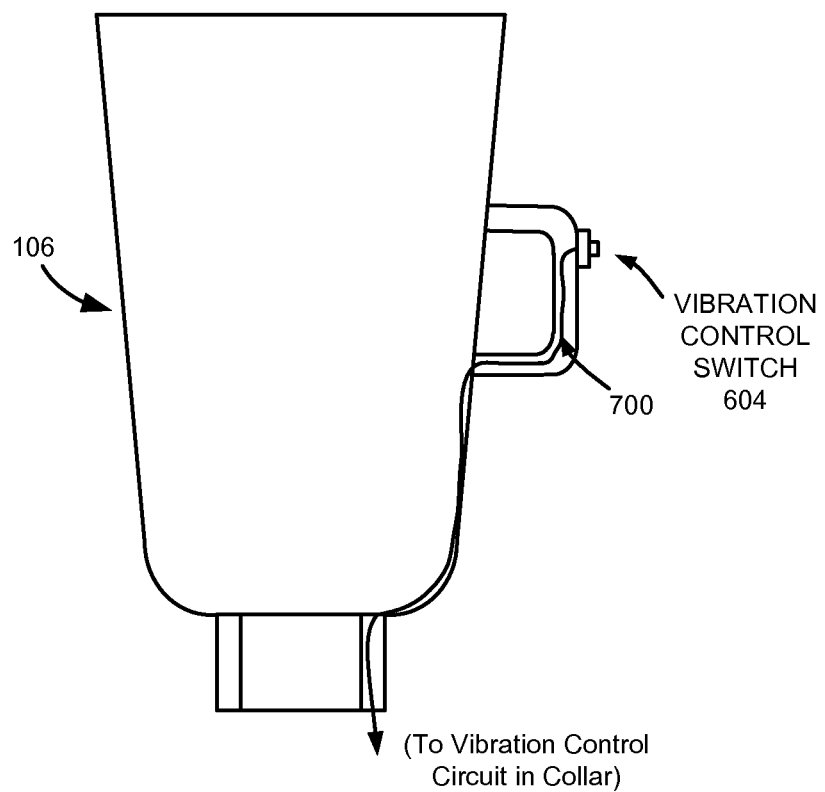
FIG. 7 is a drawing illustrating how beverage containers of the various embodiments of the present invention may include a vibration control switch that allows a person to activate, deactivate and control the one or more vibrating mechanisms during pouring.

As illustrated in FIG. 7, the switch 604 of the vibration control circuit 60 is preferably attached to the handle 128 of the beverage container 106, to allow a person pouring a beverage from the beverage container 106 to easily activate, deactivate and control the vibration mechanism as needed or desired. (Alternatively, the switch 604 may be attached to the walls of the beverage container 106 or to the collar 102.) The switch 604 may be a simple push-button type of switch, a toggle switch, a variable or sliding switch (e.g., a potentiometer), or a level-activating switch that is activated upon tipping of the beverage container 106. Wiring 700 between the switch 604 and the vibration control circuit 60 may be routed along the outside of the handle 128 and beverage container 106 or molded within the handle 128 and walls of the beverage container 106. Alternatively, a wireless transmitter integrated in the handle 128 or wall of the beverage container 106 may be used to wirelessly transmit the settings of the switch 604 to a wireless receiver configured within or attached to the collar 102 and in electrical communication with the remainder of the vibration control circuit 60.

Figure 8:
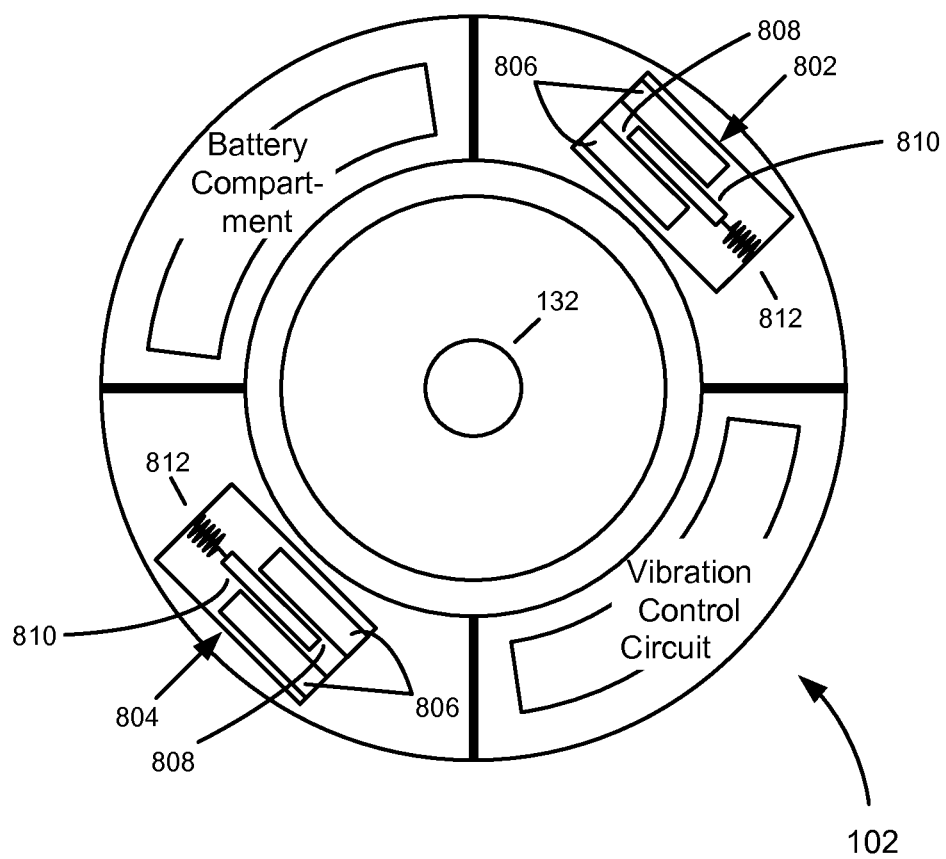
FIG. 8 is a top view of a collar that may be used in the beverage blender in FIG. 1, highlighting another way of implementing the one or more vibrating mechanisms in the collar, in accordance with an embodiment of the present invention.

Other vibrating mechanisms other than those in FIG. 4 may be used to generate the desired vibrations. For example, in the collar 102 in FIG. 8 first and second plunger-type vibrators 802 and 804, without tracks 414 and movable weights 410, are used. Similar to the plunger-type solenoid 408 described and illustrated in FIGS. 4 and 5A-B above, the first and second plunger-type vibrators 802 and 804 each have a coil 806 wound around a cylinder 808, and a plunger 810. However, rather than relying on the movement of the movable masses 410 along the tracks 414 as the source of vibrations (as in FIG. 4), the plungers 810 within the plunger-type vibrators 802 and 804 themselves provide the source of vibrations. As shown in FIG. 8, the plunger 810 of each of the plunger-type vibrators 802 and 804 is attached to one end of a spring 812, the other end of which is attached to a surface of the collar 102. The coil 806 is also attached to a surface of the collar 102. When the coil 806 is activated, the plunger 810 is pulled into the coil 806. When deactivated, the spring 812 pulls the plunger 810 back, i.e., out of coil 806. When repeatedly activated and deactivated, the plunger-type vibrators 802 and 804 generate vibration forces that are mechanically transmitted to the collar 102 and beverage container 106 when the collar 102 is attached to the beverage container 106. A vibration control circuit similar to that shown and described in FIG. 6 may be used to control the activation and deactivation of the first and second plunger-type vibrators 802 and 804.

Figure 9:
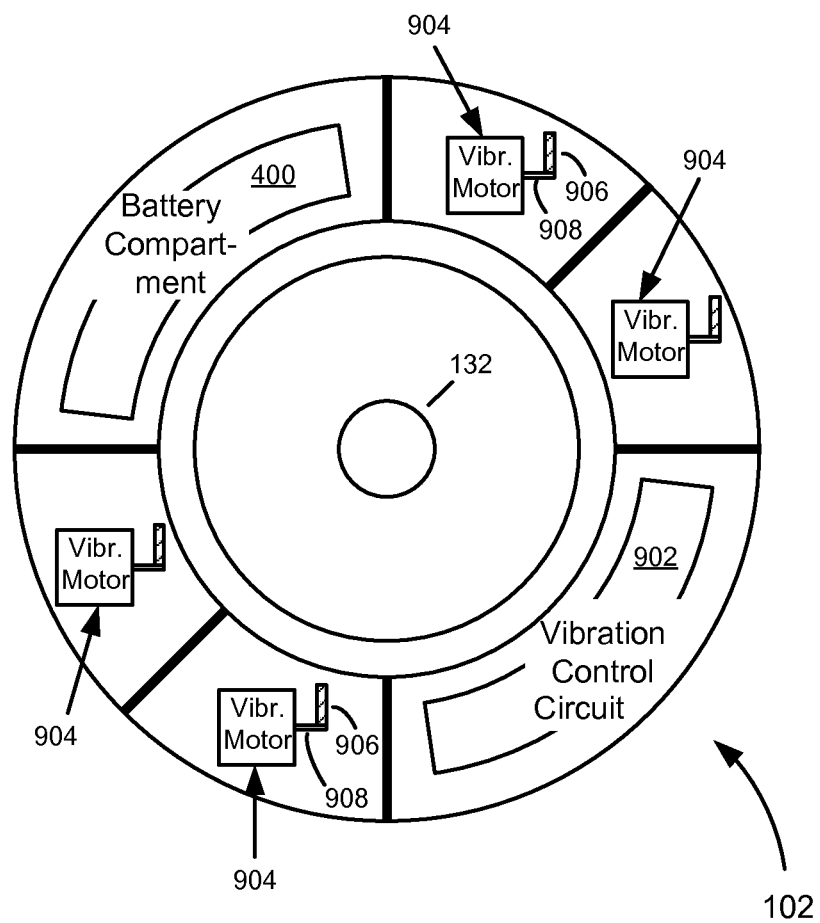
FIG. 9 is a top view of a collar that may be used in the beverage blender in FIG. 1, highlighting another way of implementing the one or more vibrating mechanisms in the collar, in accordance with an embodiment of the present invention.

FIG. 9 is a top view drawing of a collar 102 that employs another alternative approach to generating the desired vibration forces. Similar to as in the previously-described embodiments illustrated in FIGS. 4 and 8, the collar 102 is partitioned into a plurality of compartments. A first compartment is configured to house the rechargeable battery 400, another is configured to house a vibration control circuit 902, and the remaining compartments are configured to house one or more vibrating motors 904. Each of the vibrating motors 904 is similar to a conventional DC motor, except that each includes weights 906 attached to the motor shafts 908 of the motors 904. The weights 906 are offset from the longitudinal axes of the motor shafts 908. Consequently, as the motor shafts 908 rotate, the weights 906 cause the vibrating motors 904 to vibrate. The vibration forces produced by the vibrating motors 904 are mechanically transmitted to the collar 102 and then to the beverage container 106 when the collar 102 is attached to the beverage container 106.

Figure 10:
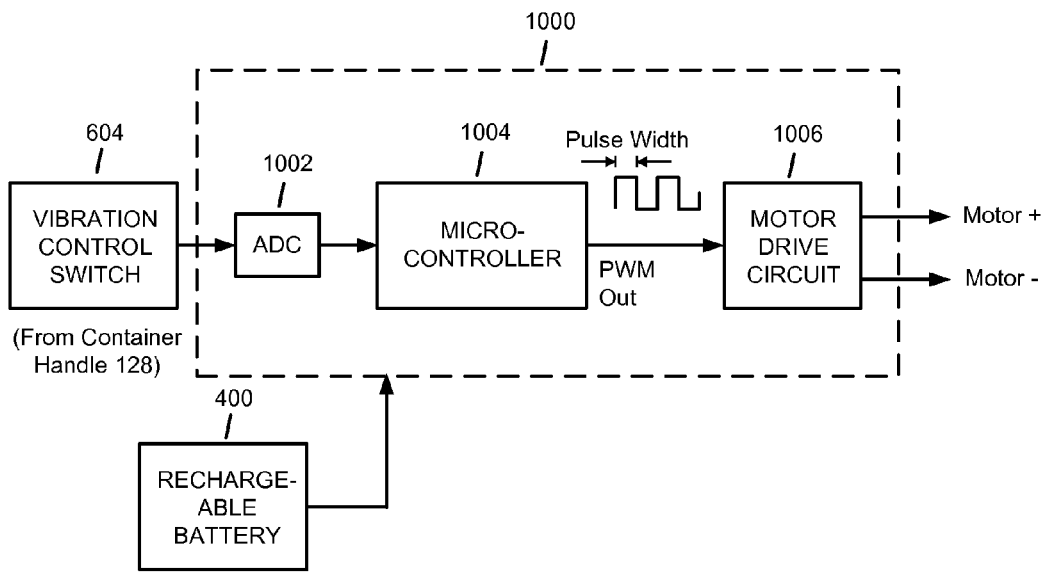
FIG. 10 is an electrical schematic of a vibration control circuit that may be used to control the vibrating mechanism of the collar in FIG. 9.

FIG. 10 is an electrical schematic of a vibration control circuit 1000 that may be used to control the operation of the vibrating motors 904 of the collar 102 in FIG. 9. The vibration control circuit 1000 comprises an analog-to-digital converter (ADC) 1002, a pulse-width modulator (PWM) formed from a microcontroller 1004, and a motor drive circuit 1006. Power to the vibration control circuit 1000 is supplied by the rechargeable battery 400 in the collar 102. The ADC 1002 is configured to digitize the switch signal setting of the vibration control switch 604 located on the handle 128 of the beverage container 106. The microcontroller 1004 is configured to respond to the digitized switch signal setting by generating a PWM signal having pulses with pulse widths that depend on the setting of the vibration control switch 604. The width of the pulses in the PWM signal relative to the period of the PWM signal cycle (i.e., the duty cycle) determines at which speed the motor drive circuit 1006 commands the vibrating motors 904 to rotate. A higher duty cycle results in a higher average DC voltage being applied to the terminals of the vibrating motors 904 and, consequently, a higher speed of rotation and more intense vibrations. A lower duty cycle slows down the vibrating motors 904 and the vibration forces they generate. Accordingly, by proper positioning of the vibration control switch 604, a person pouring a beverage from the beverage container 106 is able to variably control the duty cycle of the PWM signal and, consequently, the level of vibrations produced by the vibrating motors 904.

Figure 11:
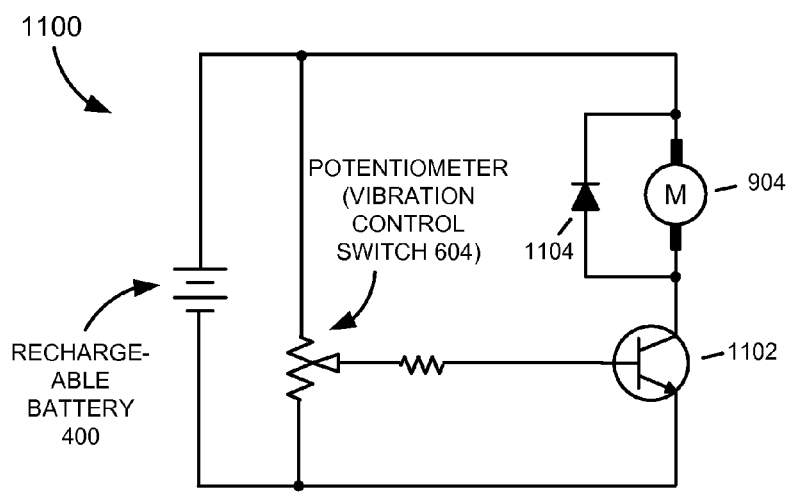
FIG. 11 is an electrical schematic of an alternative vibration control circuit that may be used to control the vibrating mechanism of the collar in FIG. 9.

FIG. 11 is drawing of an alternative vibration control circuit 1100 that may be used to control the operation of the vibrating motors 904 of the collar 102 in FIG. 9. The vibration control circuit 1100 comprises a transistor 1102 (alternatively, a Darlington pair) and a protection diode 1104. In this exemplary embodiment, the vibration control switch 604 comprises a potentiometer that serves as a voltage divider. The setting of the potentiometer 604 determines the voltage applied to the base of the transistor 1102 and, consequently, the current available to the vibrating motors 904. The greater the base voltage, the higher the current that is available. Increasing the available current allows the vibrating motors 904 to rotate more rapidly and, therefore, to vibrate more intensely. When the potentiometer 604 is adjusted so that the base voltage to the transistor 1102 is lowered, less current is available to the vibrating motors 904. With less current available, the vibrating motors 904 rotate less rapidly and vibrate less intensely.

Figure 12:
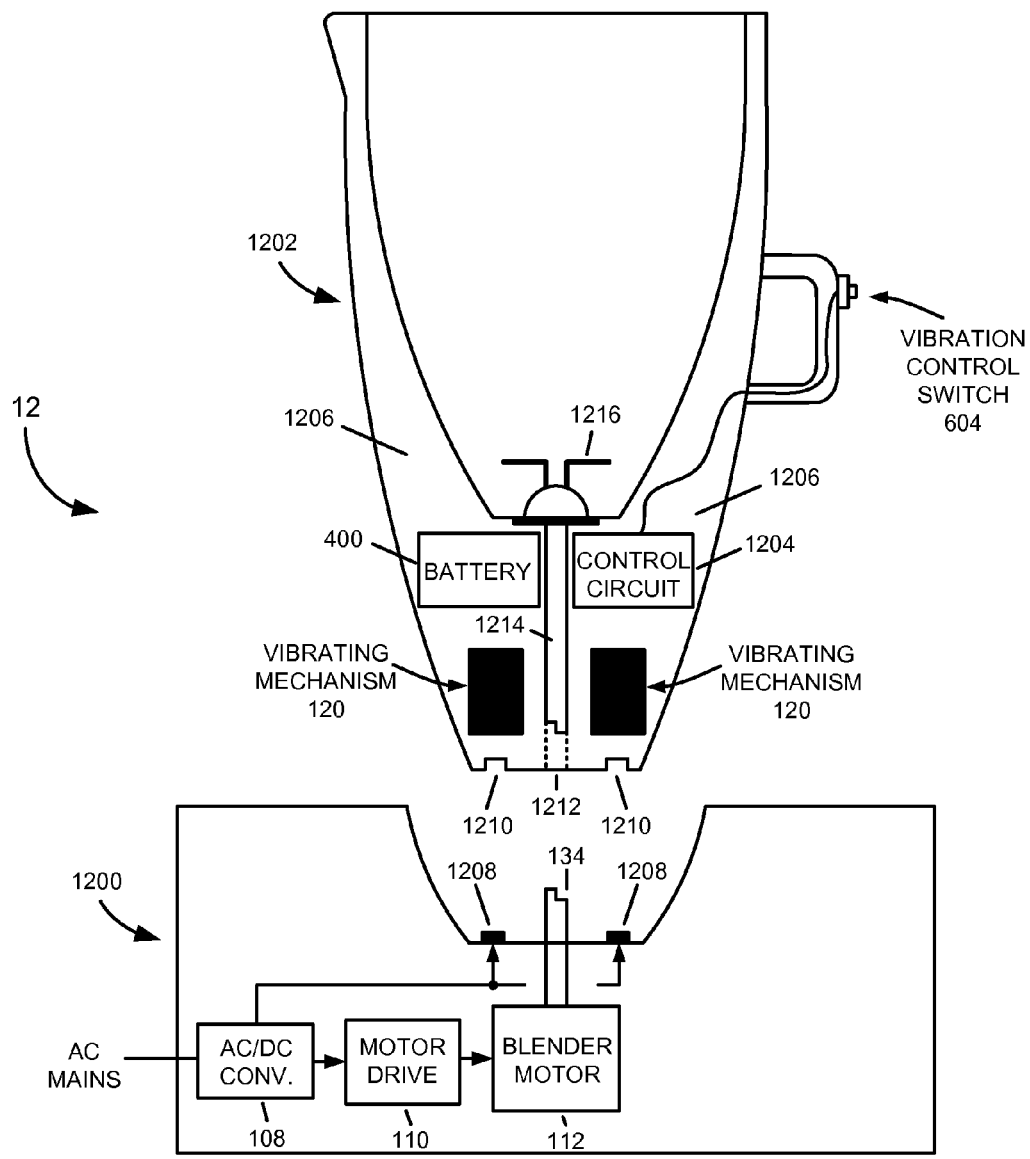
FIG. 12 is a side sectional drawing of a beverage blender having a beverage container with one or more vibrating mechanisms integrated within the walls of the beverage container, according to an embodiment of the present invention.

In the various embodiments of the invention described above, the vibrating mechanisms, rechargeable battery, and vibration control circuitry are configured within the collar 102, which, as explained above, is either permanently or releasably attached to the bottom portion 130 of the beverage container 106. FIG. 12 is a side sectional drawing of an alternative beverage blender 12 that does not have a collar as one of its components, according to an embodiment of the present invention. The beverage blender 12 comprises a blender base 1200 and a beverage container 1202. The blender base 1200 is similar to the blender base 1200 of the beverage blender 10 in FIG. 1, in that it includes an AC/DC converter 108, motor drive circuit 110, and blender motor 112. However, rather than being configured to receive and hold a beverage container with an attached collar, the blender base 1200 is designed and configured to receive the blender container 1202 directly (i.e., without any need for a collar). Further, the one or more vibrating mechanisms 120, rechargeable battery 400, and vibration control circuitry 1204 are configured within the walls 1206 of the beverage container 1202 (i.e., molded in the beverage container walls 1206 or mounted in cavities within the beverage container walls 1206), rather than being mounted or housed in a separate collar 102. For ease in illustration, the electrical connections among the one or more vibrating mechanisms 120, rechargeable battery 400, and vibration control circuitry 1204 have been omitted from the drawing. However, they are connected similar to as described in the previously-described embodiments of the invention. DC power generated by the AC/DC converter 108 in the blender base 1200 is supplied to electrical contacts 1208, which are in electrical contact with electrical contacts 1210 on the bottom of the beverage container 1202 when the beverage container 1202 is being held in the blender base 1200. The electrical contacts 1210 at the bottom of the beverage container 1202 are electrically connected to the rechargeable battery 400 (electrical connections not shown in the drawing), thereby allowing the rechargeable battery 400 to be recharged by the DC generated by the AC/DC converter 108 in the blender base 1200 when the beverage container 1202 is docked on the blender base 1200. A shaft aperture 1212 through the bottom of the beverage container 1202 is configured to receive a blade shaft 1214 of a blade 1216. When the beverage container 1202 is secured in the blender base 1200 the drive shaft 134 of the blender motor 112 engages the blade shaft 1214 via the shaft aperture 1212.

Figure 13:
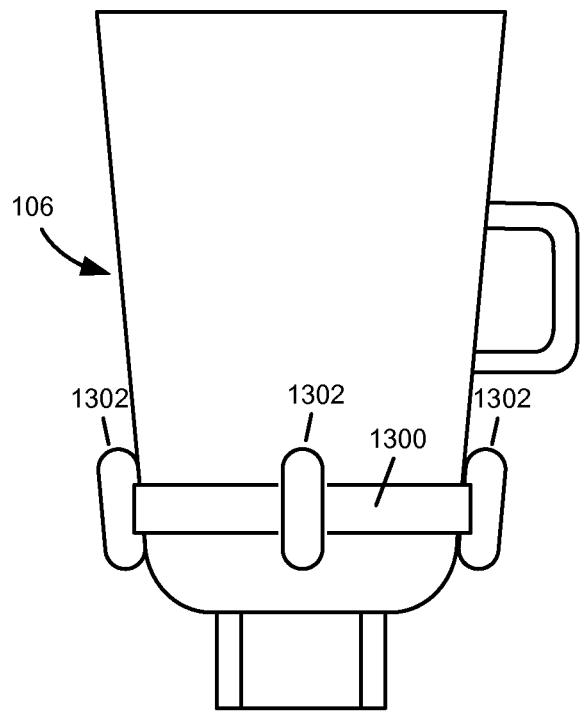
FIG. 13 is a side view drawing of a belt or strap having a plurality of vibrating packs that can be wrapped around the exterior of a beverage container, in accordance with an embodiment of the present invention.
Figure 14:
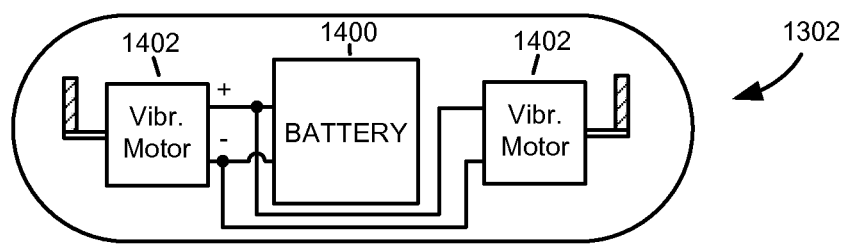
FIG. 14 is a drawing of one of the vibrating packs used in the belt or strap in FIG. 13.

FIG. 13 is a side view drawing illustrating another approach to generating the desired vibrations in the beverage container 106, according to an embodiment of the present invention. The source of vibrations comprises a belt (i.e., strap) 1300 having a plurality of vibrating packs 1302 that may be wrapped around the beverage container 106. Each of the vibrating packs 1302 includes a power source (for example, a battery) and one or more vibrating mechanisms. For example, the vibrating pack 1302 shown in FIG. 14 includes a battery 1400 and two vibrating motors 1402.

While various embodiments of the present invention have been described above, it should be understood that they have been presented by way of example, and not limitation. It will be apparent to persons skilled in the relevant art that various changes in form and detail may be made therein without departing from the spirit and scope of the invention. The scope of the invention should, therefore, be determined not with reference to the above description, but should instead be determined with reference to the appended claims, along with the full scope of equivalents to which such claims are entitled.

What is claimed is:

1. A beverage blender, comprising
a blending pitcher which includes a removable blending pitcher lid that covers a top opening of said blending pitcher during blending and a pouring guide that channels a beverage as it is being poured;
a cutting blade configured to be disposed inside said blending pitcher during blending and cut and crush ice and other solid ingredients of a semi-frozen or semi-fluidic beverage during blending of the semi-frozen or semi-fluidic beverage;
a blender collar attached to or releasably attachable to a bottom portion of said blending pitcher, said blender collar having an aperture or opening through or into which a blender motor is configured to access and turn said cutting blade during blending;
a blender base upon which said blender collar and said blending pitcher are configured to dock during blending, said blender base including a blender motor that is configured to access and turn said cutting blade, via the aperture or opening in said blender collar, when said blender collar and said blending pitcher are docked on said blender base and a semi-frozen or semi-fluidic beverage is being blended; and
a plurality of vibrators attached to or integrated within said blender collar configured to aggressively vibrate and shake said blender collar and said blending pitcher when said blender collar is attached to said blending pitcher, the blender collar and blending pitcher are undocked from the blender base, and a previously-blended semi-frozen or semi-fluidic beverage is being poured by a human pourer from said blending pitcher, said plurality of vibrators physically arranged in or about said blender collar so that the individual vibrational forces that the individual vibrators of the plurality of vibrators generate collectively combine and reinforce to produce a combined vibrational force that is mechanically transmitted to the bottom portion of said blending pitcher, and said plurality of vibrators disposed in or about said blender collar with a spacing that allows said combined vibrational force to be distributed about an entire periphery of the bottom portion of the blending pitcher, wherein:
said blender collar comprises an annular-shaped body having a plurality of compartments within which the vibrators of said plurality of vibrators are disposed, spaced and housed,
each vibrator of said plurality of vibrators comprises a plunger-type solenoid having a plunger, a movable mass, and a spring,
each compartment of said blender collar that includes a vibrator includes a track disposed between the spring and the plunger-type solenoid of the vibrator and along which said movable mass is configured to travel, and
said plunger-type solenoid and said spring are configured to force said movable mass to oscillate back and forth along said track, between said spring and said plunger-type solenoid, and
wherein said plurality of vibrators has a physical constitution and vibrational capacity necessary to compel a thick, viscous, previously-blended semi-frozen beverage to pour from said blending pitcher, including extracting portions of the thick, viscous, previously-blended semi-frozen beverage which accumulated in the bottom of said blending pitcher during blending and dislodging bits and chunks of the thick, viscous, previously-blended semi-frozen beverage which became lodged or trapped in said blending pitcher during blending.

2. The beverage blender of claim 1, wherein said blender collar further includes an additional compartment adapted to house an electrical power source that is configured to supply electrical power to said plurality of vibrators.

3. The beverage blender system of claim 1, wherein said blender collar further includes one or more additional compartments configured to house one or more rechargeable batteries.

4. The beverage blender of claim 3, wherein:
said blender collar includes electrical contacts electrically connected to said one or more rechargeable batteries, and
said blender base includes a DC power supply electrically connected to electrical contacts that are adapted to electrically connect to the electrical contacts of said blender collar when said blender collar is docked onto said blender base.

5. The beverage blender of claim 2, wherein said blender collar further includes a compartment for housing a control circuit configured to control the operation of said plurality of vibrators.

6. The beverage blender of claim 5, wherein said control circuit is configured to control the magnitude of vibrations generated by said plurality of vibrators.

7. The beverage blender of claim 4, further comprising a level-activating switch that is electrically connected to said control circuit and configured to automatically activate said plurality of vibrators when said blending pitcher is tipped to pour a beverage.

8. The beverage blender of claim 1, wherein said track is an arcuate track.

* * * * *